April 22, 1924.

E. M. GOLDSMITH 1,491,259

MEANS FOR SUPPORTING COILED STRIPS OF FABRIC

Filed March 24, 1922   2 Sheets-Sheet 1

WITNESS:
Rob't R Mitchell.

INVENTOR
Edwin M. Goldsmith
BY
Frank S. Busser
ATTORNEY.

April 22, 1924.

E. M. GOLDSMITH 1,491,259

MEANS FOR SUPPORTING COILED STRIPS OF FABRIC

Filed March 24, 1922　　2 Sheets-Sheet 2

WITNESS:

INVENTOR

Edwin M. Goldsmith
BY
Frank S. Busser
ATTORNEY

Patented Apr. 22, 1924.

1,491,259

UNITED STATES PATENT OFFICE.

EDWIN M. GOLDSMITH, OF PHILADELPHIA, PENNSYLVANIA, ASSIGNOR TO FRIED-BERGER-AARON MANUFACTURING COMPANY, OF PHILADELPHIA, PENNSYLVANIA, A CORPORATION OF PENNSYLVANIA.

MEANS FOR SUPPORTING COILED STRIPS OF FABRIC.

Application filed March 24, 1922. Serial No. 546,344.

*To all whom it may concern:*

Be it known that I, EDWIN M. GOLDSMITH, a citizen of the United States, residing at Philadelphia, county of Philadelphia, and State of Pennsylvania, have invented a new and useful Improvement in Means for Supporting Coiled Strips of Fabric, of which the following is a full, clear, and exact description, reference being had to the accompanying drawings, which form a part of this specification.

It is customary to wind a ribbon, tape, braid and similar long strips of fabric upon reels and sell the goods, so wound, to retailers who unwind the goods from the reel and cut off measured lengths for sale to the ultimate consumer. The most common form of reel comprises a solid short wooden axle and discs of pasteboard secured at opposite ends thereof, the reel having a central round hole adapting it to be slipped upon a rod of matting cross-section. Other less commonly used forms of reels have been devised.

The object of the present invention is to provide a reel and holder therefor which are so adapted to each other that the reel may be stood upright in the holder and will maintain its upright position while the goods are unwound from the reel.

Several embodiments of the invention are shown in the accompanying drawings, in which—

The preferred embodiment of the invention is shown in Figs. 1 to 4 inclusive.

Secured to opposite ends of a short wooden axle or hub $a$ are discs $b$ affording a space between them for a coil of ribbon, braid, tape or the like. It being intended to hold the reel stationary, it is desirable to apply a sleeve or collar $c$ loosely to the axle $a$ so that the collar and hence the coil of fabric may rotate freely on the axle.

Corresponding parts of the margins of the two discs are provided with projecting wings $d$. Any other workable expedient for interrupting the circular contour of the margins may be provided. Preferably these wings are of increasing width as the distance from the center or axis of the reel increases.

Figures 1, 2:
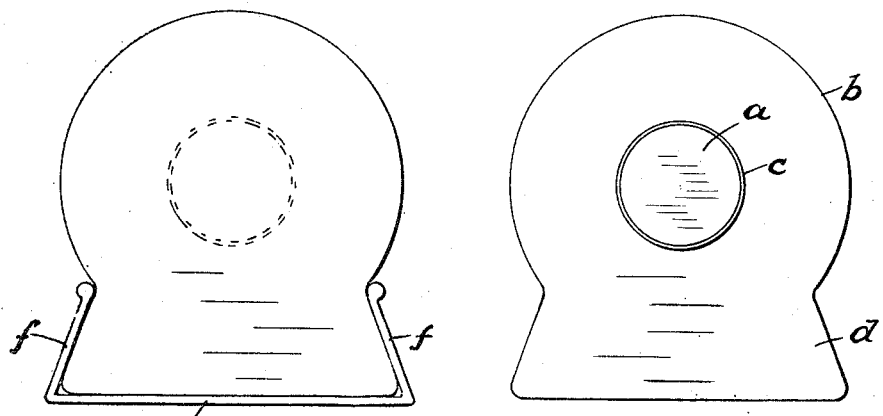
Fig. 1 is an end view of a holder and a reel positioned therein.
Fig. 2 is an end view of the reel with one of the end discs removed.
Figure 3:
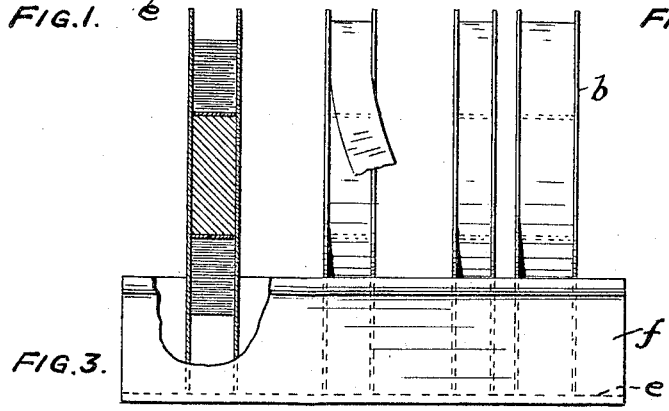
Fig. 3 is a side view of the holder with reels mounted therein, partly in section.
Figure 4:
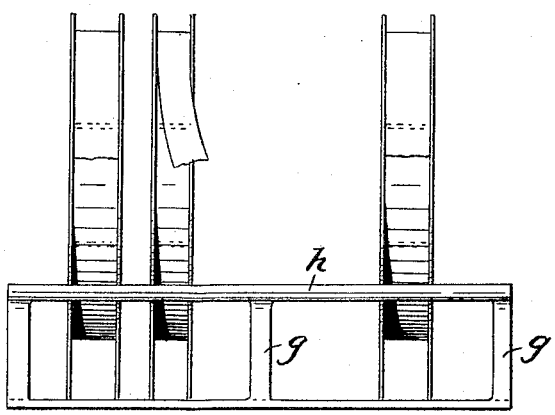
Fig. 4 is a view, similar to Fig. 3, of a modified form of holder.

The reel holder comprises a flat base $e$ and side walls $f$ (which may be solid as shown in Fig. 3), which slope inward toward each other from the base. Instead of making the walls solid, they may each comprise a plurality of posts $g$ and a top longitudinal bar $h$, as shown in Fig. 4. Solid walls are preferred, as they afford a readily visible surface for carrying advertising matter.

The internal contour of the reel holder corresponds to the contour of the two aligning wings $d$, so that the reel may be slipped within the holder from either open end of the holder and, when so introduced, will assume a vertical position and be held in that position during the unwinding of fabric therefrom.

Another advantage of this particular structure of reel is that in case a customer desires to purchase an entire reel of fabric, or the remaining length of fabric that may be on the reel, he may take with him the reel itself, which may be stood in an upright position without any support.

Modifications of the invention are shown in Figs. 5 to 10 inclusive.

Figure 5:
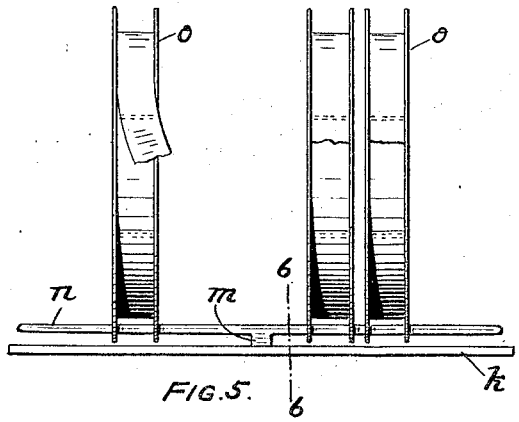
Fig. 5 is a view, similar to Figs. 3 and 4, of a modified form of reel and holder.
Figure 7:
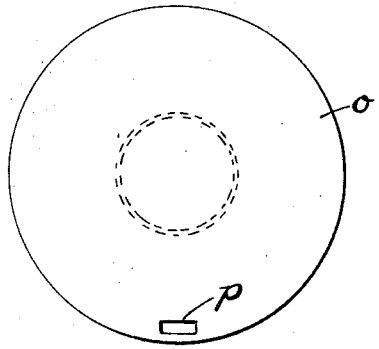
Fig. 7 is a face view of the reel of Fig. 5.
Figure 6:
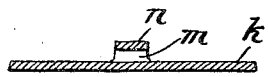
Fig. 6 is a section on the line 6—6 of Fig. 5.

In Figs. 5 and 6 I show a reel holder comprising a base $k$, a central short post $m$ and a horizontal bar $n$ (non-circular in cross-section) secured at its center to the top of the post. The two discs of a reel $o$ are provided near their edges with holes $p$ aligning with each other and corresponding in contour to the bar $n$. A reel may be slipped onto the bar from either end of the latter and will be thereby supported and maintained in upright position and allow the fabric to be unwound therefrom.

Figure 8:
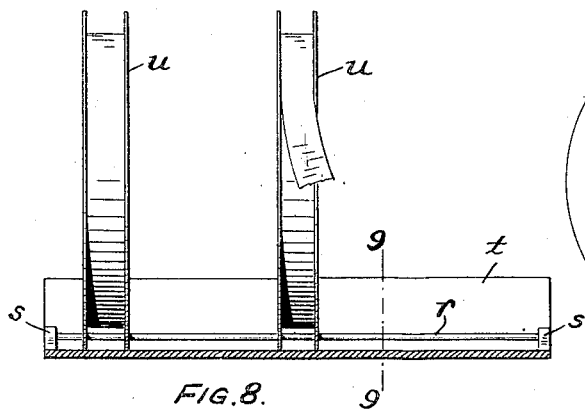
Figs. 8, 9 and 10 are views, corresponding respectively to Figs. 5, 6 and 7, of another modification.
Figure 10:
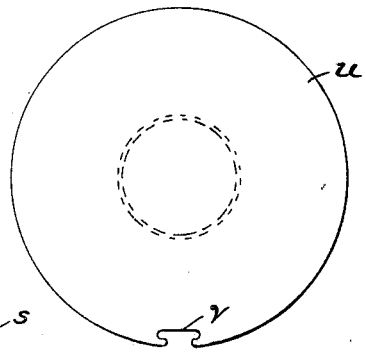
Figure 9:
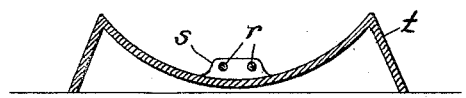

In Figs. 8 and 9 I show a reel holder comprising two longitudinally extending parallel resilient and elastic wires or rods $r$ supported in any convenient way as by supporting their ends on posts *s* and a base *t*. Each disc of reel *u* is notched near its edge, as shown at *v*, the notch being widened at its base to form opposing seats for the rods or wires *r*. By positioning the reel so that the notched portions *v* of the disc are immediately over the rods and pressing the reel down, the rods will be pressed toward each other as they pass through the neck of the notch and as they emerge therefrom will then spring apart into their normal positions into their seats. The reel will thereby be supported in an upright position and will be maintained in that position during the unwinding of the fabric therefrom.

As shown, base *t* is shaped to partially conform to the circular shape of the reel. This adds to the security with which the reels are held upright, as well as offering a longitudinal face suitable for advertising matter. However, it is evident this base might be simply a flat plate, as in the holder shown in Figs. 5 and 6, and also that said last mentioned holder might have a base similar to that shown in Fig. 9.

It will be understood that the embodiments of the invention shown in the drawings and above described are illustrative merely, my invention not residing in specific details of construction except so far as any of the claims may expressly include such details.

Having now fully described my invention, what I claim and desire to protect by Letters Patent is:

1. The combination with a reel comprising spaced-apart discs each having a part of non-circular contour projecting at its rim, of a reel holder of a fractional part of the height of the reel and provided with a pocket open at the top and end and into the end of which the non-circular parts of the reel discs may be entered and moved in the direction of the axis of the reel, the pocket being so shaped that by reason of its engagement with the reel, as specified, at spaced-apart points, the reel is confined from turning in its pocket and from entry or withdrawal except in the axial direction specified.

2. The combination with a reel holder comprising a base and longitudinally extending means supported thereon, of a reel comprising a hub and end discs, both said discs being shaped in corresponding parts of their peripheral portions to slide along said means and be confined thereby from upward and sidewise movement relatively thereto and from turning thereon.

3. The combination with a reel holder comprising discs each of which has extending therefrom a wing having outwardly diverging side edges and a straight outer edge, of a reel holder comprising a flat base and longitudinally extending walls converging upwardly, the contour of the wings of the reel and the contour of the space enclosed by the base and walls of the holder being similar in cross-section to permit the reel to be inserted into the end of the holder and be confined therein from movement except in an endwise direction.

4. The combination with a reel holder comprising a hub and a pair of discs each of which has extending therefrom a wing having downwardly diverging side edges, of an open-ended reel holder having side walls converging upward to form a pocket for the reception of the wings, the contours and distances apart of the side edges of a wing and the side walls of the pocket substantially corresponding so that the wings neatly engage the walls of the pocket and are held thereby in an upright position and from substantial movement except in an endwise direction.

In testimony of which invention, I have hereunto set my hand, at Philadelphia, Pa., on this 22nd day of March, 1922.

EDWIN M. GOLDSMITH.